(12) United States Patent
Siegel et al.

(10) Patent No.: US 6,783,805 B2
(45) Date of Patent: Aug. 31, 2004

(54) GELATIN NANOCOMPOSITES

(75) Inventors: Richard W. Siegel, Menands, NY (US); Linda S. Schadler, Clifton Park, NY (US); Tao Li, Troy, NY (US); John Mendel, Rochester, NY (US); Glen C. Irvin, Rochester, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 40 days.

(21) Appl. No.: 09/976,252

(22) Filed: Oct. 12, 2001

(65) Prior Publication Data

US 2003/0070583 A1 Apr. 17, 2003

(51) Int. Cl.[7] .................... B05D 3/02; C09D 189/00; G03C 5/18; B32B 9/00
(52) U.S. Cl. ............... 427/384; 106/157.2; 106/157.8; 106/287.17; 106/287.18; 106/287.35; 430/449; 430/428; 430/702
(58) Field of Search .................. 427/384; 106/157.2, 106/157.8, 287.17, 287.18, 287.35, 157.7, 205.9, 287.19; 430/449; 428/702

(56) References Cited

U.S. PATENT DOCUMENTS

| 4,173,480 | A | * | 11/1979 | Woodward | 430/536 |
|---|---|---|---|---|---|
| 5,254,448 | A | * | 10/1993 | Yamada et al. | 430/523 |
| 5,503,771 | A | * | 4/1996 | Staley et al. | 516/78 |
| 5,565,311 | A | * | 10/1996 | Kawamoto | 430/523 |
| 5,750,318 | A | | 5/1998 | Lambert et al. | 430/346 |
| 5,962,210 | A | | 10/1999 | Hahm et al. | 430/567 |
| 6,020,419 | A | | 2/2000 | Bock et al. | 524/590 |
| 6,190,846 | B1 | | 2/2001 | Majumdar et al. | 430/529 |
| 6,231,970 | B1 | * | 5/2001 | Andersen et al. | 428/332 |
| 6,232,049 | B1 | | 5/2001 | Nair et al. | 430/350 |
| 6,258,517 | B1 | | 7/2001 | Qiao et al. | 430/452 |
| 2002/0045010 | A1 | * | 4/2002 | Rohrbaugh et al. | 427/372.2 |

FOREIGN PATENT DOCUMENTS

| DE | 0 943 664 A2 | 2/2000 |
|---|---|---|
| EP | 000749040 A1 * | 12/1996 |
| JP | 51141620 | 12/1976 |
| JP | 56143431 | 11/1981 |
| JP | 60258541 | 12/1985 |
| JP | 63287849 | 11/1988 |
| JP | 1141783 | 6/1989 |

* cited by examiner

*Primary Examiner*—Helene Klemanski
(74) *Attorney, Agent, or Firm*—Heslin Rothenberg Farley & Mesiti P.C.; Mary Louise Gioeni, Esq.

(57) ABSTRACT

Scratch-resistant nanocomposite materials contain at least one film-forming hydrophilic colloid and at least one ceramic nanoparticle material. In particular, the film-forming hydrophilic colloid may be a gelatin, and the ceramic nanoparticle material may be alumina. In another aspect, the invention relates to scratch-resistant imaging elements comprising a support and a layer comprising such a nanocomposite material. The nanocomposite layer may be employed as an imaging layer, or as a protective layer disposed between an imagining layer and the environment.

12 Claims, 16 Drawing Sheets

(a)

GELATIN NANOCOMPOSITES

FIELD OF THE INVENTION

The invention relates to composite materials comprising film-forming hydrophilic colloids and ceramic nanoparticle materials.

BACKGROUND OF THE INVENTION

For most types of gelatin-based imaging elements, surface abrasion and scratching results in reduction of image quality. For example, silver halide photographic elements contain light sensitive silver halide in a hydrophilic emulsion. An image is formed in the element by exposing the silver halide to light, or to other actinic radiation, and developing the exposed silver halide to reduce into elemental silver. In color photographic elements a dye image is formed as a consequence of silver halide development by one of several different processes. The most common is to allow a by-product of silver halide development, oxidized silver halide developing agent, to react with a dye forming compound called a coupler. The silver and unreacted silver halide are then removed from the photographic element, leaving a dye image. In either case, formation of the image commonly involves liquid processing with aqueous solutions that must penetrate the surface of the element to come into contact with silver halide and coupler. Thus, gelatin, and similar natural or synthetic hydrophilic polymers, have proven to be the binders of choice for silver halide photographic elements. Unfortunately, formulation of gelatin and similar polymers so as to facilitate contact between the silver halide crystal and aqueous processing solutions may lead to a final product lacking in toughness and especially, in scratch resistance. Thus, processing the image and, later, casual handling of the same, can easily mark or disfigure the image. There is, therefore, a need for an imaging element having improved scratch resistance over materials currently used.

SUMMARY OF THE INVENTION

It has been unexpectedly discovered that incorporation of a ceramic nanoparticle material, along with a film-forming hydrophilic colloid, in a layer of an imaging element subject to abrasion can dramatically improve the scratch resistance of the imaging element, while maintaining optical clarity. Accordingly, in one aspect, the present invention relates to nanocomposite materials comprising at least one film-forming hydrophilic colloid and at least one ceramic nanoparticle material. The film-forming hydrophilic colloid may be a gelatin, and the ceramic nanoparticle material may be alumina. In another aspect, the invention relates to scratch-resistant imaging elements comprising a support and a layer comprising such a nanocomposite material. The nanocomposite layer may be employed as an imaging layer, or as a protective layer disposed between an imaging layer and the environment.

BRIEF DESCRIPTION OF THE DRAWINGS

FIGS. 4A and 4B show unfilled gelatin;

FIG. 4C shows 0.5 wt % (9.1 dry wt % 5) $Al_2O_3$ nanofilled gelatin film; and

FIGS. 4D and 4E show 1 wt % (16.7 dry wt %) $Al_2O_3$ nanofilled gelatin film.

FIG. 9A shows unfilled gelatin;

FIG. 9B shows 0.5 wt % (9.1 dry wt %); and

FIG. 9C shows 1 wt % (16.7 dry wt %) $Al_2O_3$-filled gelatin film after aging for 30 days.

FIG. 13A shows unfilled deionized gelatin;

FIG. 13B shows 0.5 wt % (9.1 dry wt %); and

FIG. 13C shows 3 wt % (35.5 dry wt %).

DETAILED DESCRIPTION OF THE INVENTION

Figure 1A:
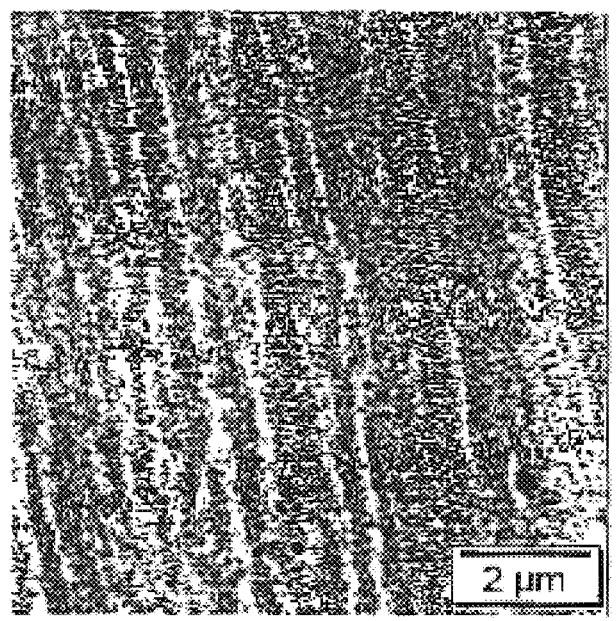
FIGS. 1A and 1B are micrographs showing the dispersion of nanoscale alumina in gelatin at 1 wt % (16.7 wt % dry) of filler at two magnifications.

The present invention relates to nanocomposite materials containing at least one film-forming hydrophilic colloid and at least one ceramic nanoparticle material. Film-forming hydrophilic colloids useful in the present invention include gelatin, dextran, gum arabic, zein, casein, pectin, collagen derivatives, collodion, agar—agar, arrowroot, albumin, water-soluble polyvinyl compounds, such as polyvinyl alcohol, polyacrylamide, and poly(vinylpyrrolidone), and mixtures thereof. In particular, gelatin, or a mixture of gelatin and dextran, gum arabic, zein, casein, pectin, collagen derivatives, collodion, agar—agar, arrowroot, or albumin may be used. For example, the silver halide emulsion layer of a photographic element typically comprises a film-forming hydrophilic colloid, and the most commonly used of these is gelatin. The gelatin can be any of the types of gelatin known in the imaging art. These include, for example, alkali-treated gelatin (cattle bone or hide gelatin), acid-treated gelatin (pigskin or bone gelatin), and gelatin derivatives such as partially phthalated gelatin, and acetylated gelatin.

Ceramic nanoparticle materials found to be useful as part of the compositions of the present invention include metal, non-metal and semimetal oxides, nitrides, carbides, carbonitrides, oxynitrides and oxycarbonitrides, and mixtures thereof. Where the ceramic nanoparticle materials is a metal nitride, metal carbide, metal carbonitride, metal oxynitride, metal oxycarbonitride, or a mixture thereof, the metal may be aluminum, titanium, zirconium, magnesium, yttrium, cerium, or calcium; in particular, the metal may be aluminum or titanium. Non-metals useful as nanocrystalline ceramic oxides, nitrides, carbides, carbonitrides, oxynitrides and oxycarbonitrides include silicon and germanium, and particularly silicon. Examples of non-metal ceramic nanoparticle materials include silicon carbide, silicon oxide, and silicon nitride. Semimetals useful as nanocrystalline ceramic oxides, nitrides, carbides, carbonitrides, oxynitrides and oxycarbonitrides include bismuth and beryllium. Examples of non-metal ceramic nanoparticle materials are bismuth oxide and beryllium oxide. Mixed compounds such as SiAlON, mullite ($Al_2O_3.SiO_2$), and spinel ($MgO.Al_2O_3$) may also be used. In particular, the ceramic nanoparticle material may be a nanocrystalline ceramic oxide, or a mixture thereof, including non-metal oxides, semimetal oxides and metal oxides. The metal of these nanocrystalline ceramic oxides may be aluminum, titanium, zirconium, magnesium, yttrium, cerium, or calcium, or a mixture thereof; in particular, the metal may be aluminum or titanium. Examples of ceramic metal oxides are alumina, titania, zirconia, antimony tin oxide, cerium oxide, copper oxide, indium oxide, indium tin oxide, iron oxide, silicon dioxide, tin oxide, titanium dioxide, yttrium oxide, zinc oxide, barium oxide, calcium oxide, chromium oxide, magnesium oxide, manganese oxide, molybdenum oxide, neodymium oxide, and strontium oxide. A particularly useful ceramic metal oxide nanoparticle material is alumina.

Average particle size of the ceramic nanoparticle material typically ranges from about 1 to 100 nm. In some embodiments, average particle size may be limited to the range from 3 nm to 100 nm. Average particle size may be further limited to the range from 5 nm to 50 nm, and even further to the range from 10 nm to 30 nm. Such materials may be obtained from Nanophase Technologies Corp., Romeoville, Ill. In this context, the term 'average particle size' refers to particle size as determined by electron microscopy methods or by surface area measurements. Narrowing the particle size distribution of the ceramic nanoparticle material by removing large particles before preparing a dispersion thereof can result in an imaging element having even greater scratch resistance. Large particles may be removed by settling or sedimentation techniques, for example, by centrifugation. Accordingly, it may be desirable to limit particle size of the ceramic nanoparticle material to a maximum of 100 nm.

Nanocomposites according to the present invention may comprise 25–99.9 parts by weight of at least one film-forming hydrophilic colloid and 0.1–75 parts by weight of at least one ceramic nanoparticle material. In some embodiments, these amounts may be 50–95 parts by weight of the film-forming hydrophilic colloid and 5–50 parts by weight of the ceramic nanoparticle material. In some embodiments, these amounts may be further limited to 70–90 parts by weight film-forming hydrophilic colloid and 10–30 parts by weight ceramic nanoparticle material. It should be noted that any numerical values recited herein include all values from the lower value to the upper value in increments of one unit provided that there is a separation of at least 2 units between any lower value and any higher value. As an example, if it is stated that the amount of a component or a value of a process variable such as temperature, pressure, or time, is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The scratch-resistant imaging elements of the present invention can be of many different types depending on the particular use for which they are intended. Such elements include, for example, photographic, electrostatographic, photothermographic, migration, electrothermographic, dielectric recording and thermal dye transfer imaging elements. Photographic elements include photographic films, photographic papers and photographic glass plates.

Scratch-resistant imaging elements according to the present invention comprise a support and a scratch-resistant layer disposed between a surface of the support and the environment. The scratch-resistant layer comprises at least one film-forming hydrophilic colloid and at least one ceramic nanoparticle material. The support is typically composed of polymeric films, papers, or glass, and may be 2 to 15 mils (0.002 to 0.015 inches) thick. In addition, the imaging elements characteristically contain an image-forming layer, which may be a radiation-sensitive silver halide emulsion layer. In one embodiment, the transparent layer is disposed on the imaging layer and functions as a protective layer for the image. If desired, the imaging elements may have both an imaging layer and a protective layer which comprise at least one film-forming hydrophilic colloid and at least one ceramic nanoparticle material.

The present invention also relates to a method for fabricating a scratch-resistant imaging element, and compositions for use therein. In the method, a ceramic nanoparticle material is dispersed in an aqueous solution of a film-forming hydrophilic colloid to form a coating composition; the coating composition is applied to the surface of a support for an imaging element; the coated surface is dried; and, optionally, aged. The resulting imaging element is resistant to scratching and has excellent optical clarity. The present invention also relates to compositions comprising at least one ceramic nanoparticle material and at least one film-forming hydrophilic colloid.

Scratch-resistant imaging elements may be fabricated by dispersing a ceramic nanoparticle material in an aqueous solution of a film-forming hydrophilic colloid to form a coating composition, applying the coating composition between at least one surface of the support and the environment, and drying the coated surface. The dispersion may be formed by any of the known procedures for dispersing a powder in a polymer solution; ultrasonic mixing is an example of an effective procedure. It may be necessary to maintain the temperature of the dispersion below 60° C. during mixing when the film-forming hydrophilic colloid is a gelatin. Coating procedures are also well known; examples include dip coating, knife coating, knife over roll coating, and spray coating. The coating may be dried at or below room temperature. Where a gelatin is used, temperature is typically maintained at or below 40° C. Aging the dried film, typically at ambient temperatures for a period of at least 7 to 10 days, may improve scratch resistance.

EXAMPLES

Example 1

Preparation of Composite Gelatin Films

Deionized protein gelatin was obtained from Eastman Kodak Company, Rochester, N.Y. ($T_g$=60° C.; $T_m$=90° C.;

pI=~5.5). The gelatin was soaked in an appropriate amount of deionized water for 2 hours at room temperature and then magnetically stirred in a 40° C. bath to form a 10 wt % gelatin solution. Molecular weight of the gelatin in the solution ranged from 50 kDa to 250 kDa. To prepare aqueous dispersions of nanoparticle $Al_2O_3$ (13 nm average diameter; specific surface area=84 $m^2$/g; density=3.6 g/$cm^3$, predominately gamma phase (lot no. A60715-03) Nanophase Technologies Corporation, Romeoville, Ill.), the nanoparticle powder was mixed with deionized water using an ultrasonic liquid processor (VCX 750, Sonics & Materials, Inc, Newton, Mass.) at 50% amplitude for 2 minutes. Comparative experiments were carried out using a faceted $Al_2O_3$ powder having a particle size in the micron range. The material was obtained from Aldrich (catalog no. 26,549-7) (alpha phase, particle size<10 $\mu$m, purity 99.7%).

Figure 1B:
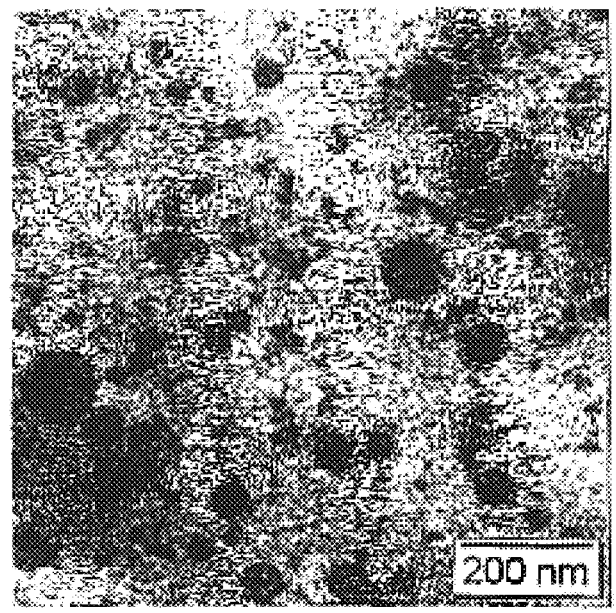

The powder suspensions and the gel solutions were ultrasonically mixed under the same conditions to give gel solutions containing 0.5 wt %, 1 wt %, 3 wt %, and 5 wt % $Al_2O_3$. Table 1 lists materials and amounts used in preparing the samples. These solution concentrations correspond to 9.1%, 16.7%, 35.5%, and 50% $Al_2O_3$ (weight/total dry weight) Sonication conditions were chosen to break up agglomerates, minimize sintering of $Al_2O_3$ particles, disperse particles thoroughly in the gel solution, and avoid breakdown of polymer chains. The temperature in the solutions was monitored during sonication to ensure it was below 60° C. ($T_g$ of the gel). The pH value was maintained between 5 and 6.5. The temperature of the solution was set at 40° C., and, depending on its $Al_2O_3$ concentration, 4 to 7 ml of solution were poured into a petri dish so that the thickness of films after drying would be about 80–120 $\mu$m. The drying process started with placing gelatin solutions in a well-ventilated hood for 30 min at room temperature, followed by chill setting at 10° C. in a refrigerator for 2 hours. Finally, the gelatins were dried in an oven overnight at 40° C. The samples were stored in a dessicator. FIG. 1 shows the typical degree of dispersion achieved for a sample containing as-received nanoparticles. Note the excellent dispersion and the occasional particle greater than 100 nm in diameter.

TABLE 1

Preparation of Gelatin/Nanoparticle Dispersions

| $Al_2O_3$ Nano-particles, g | DI Water, g | Gel Solution (10 Wt %), g | Final filler wt/total solution wt, % | Final filler content, wt/total dry wt, % | Initial Volume, ml |
|---|---|---|---|---|---|
| 0.2 | 19.8 | 20 | 0.5 | 9.9 | 7 |
| 0.4 | 19.4 | 20 | 1 | 16.67 | 6 |
| 1.2 | 18.8 | 20 | 3 | 37.5 | 5 |
| 2.0 | 18.0 | 20 | 5 | 50 | 4 |

Figure 2A:
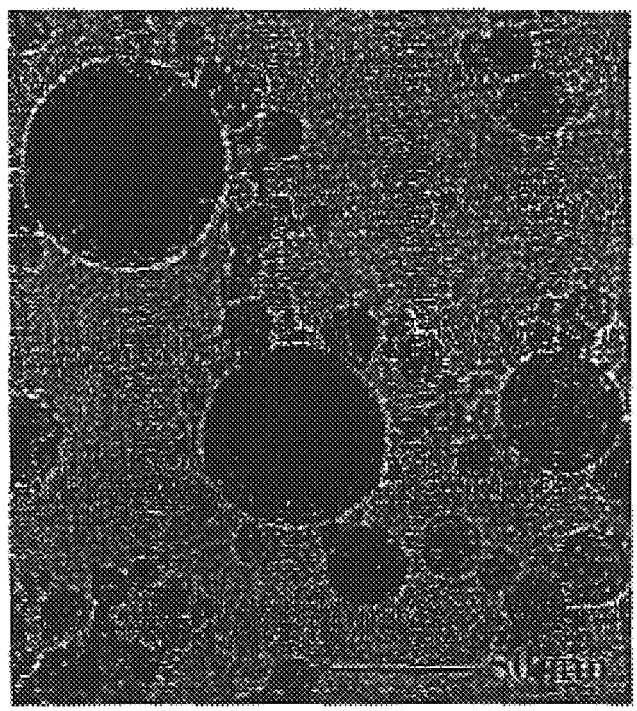
FIGS. 2A and 2B are TEM images showing the morphology of $Al_2O_3$ particles before and after centrifuging, respectively.
Figure 2B:
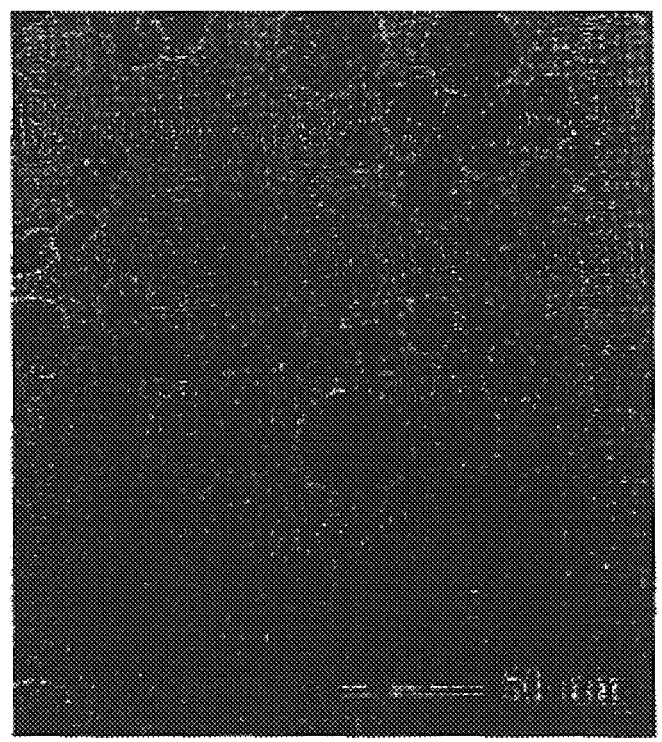
Figure 2C:
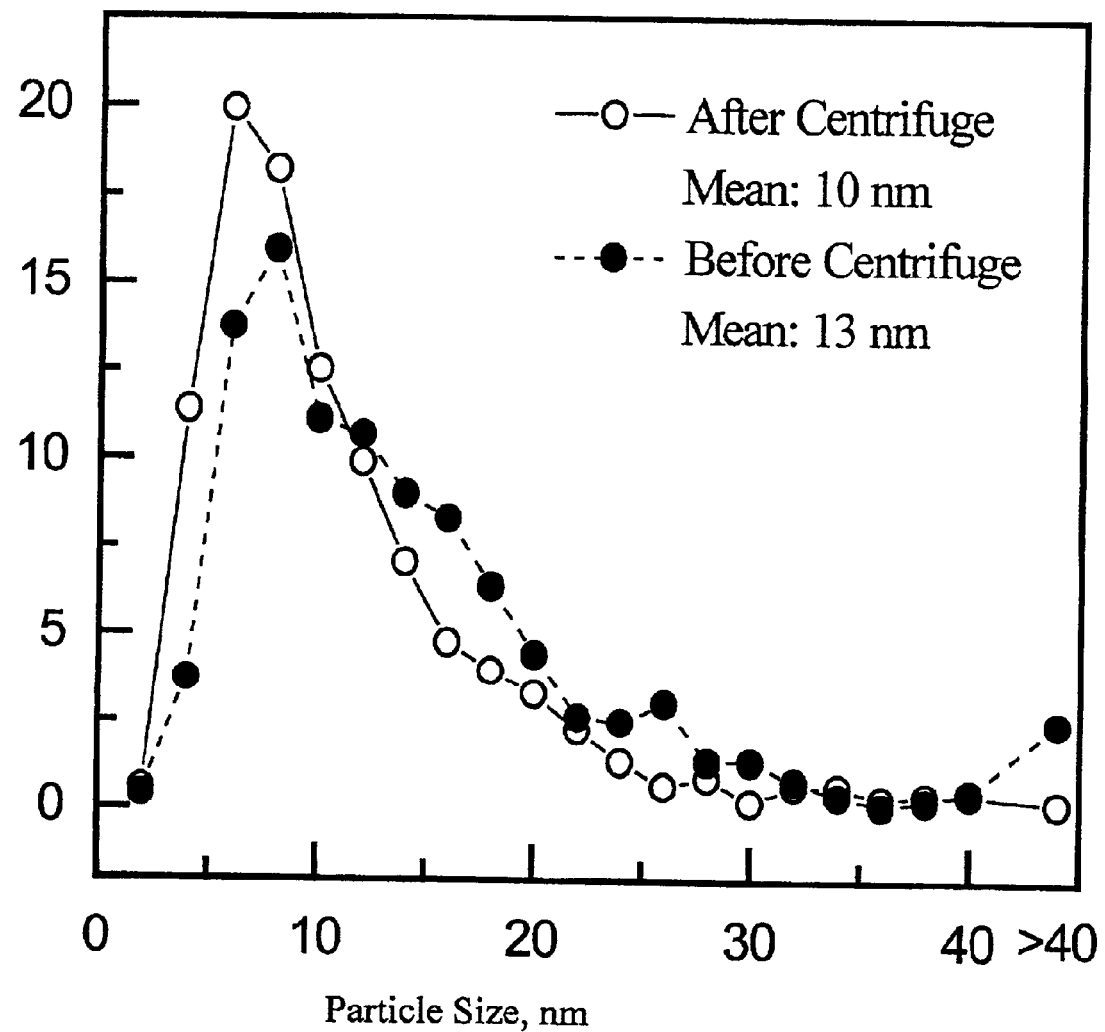
FIG. 2C shows particle size distribution of $Al_2O_3$ nanoparticles before and after centrifuging.

In order to narrow the size distribution of the nanoparticles, as-received nanoparticle $Al_2O_3$ powder was ultrasonically dispersed in ethyl alcohol as described above. Large particles were removed from the dispersion by centrifuging at 3000 rpm for 3 minutes with a force reaching approximately 1380 G. FIGS. 2A and 2B display the morphologies of $Al_2O_3$ particles before and after centrifuging, respectively. It can be seen from the micrographs in FIGS. 2A and 2B that larger particles (especially particles over 70 nm in diameter) were selectively removed. FIG. 2C shows that the average particle size of the nanoparticles in the dispersion, as determined by TEM, decreased from 13 to 10 nm, and that the particle size distribution was narrowed.

Gelatin is a semi-crystalline biopolymer that has an amorphous glassy composition. During the initial setting of the film, an equilibrium state is not reached, thus over time the gel will undergo microstructural changes as it approaches equilibrium. The resultant microstructure depends strongly on the temperature and relative humidity of the setting conditions, as well as concentration, ionic strength, and pH. This microstructure development can impart more order in the system through development of triple helices (similar to collagen) and subsequent orientation and aggregation of these helices. The result is that, as time passes, the modulus increases and the film can become more brittle but stronger. The absorption of water can also change the mechanical properties of the film by changing the equilibrium structure by breakup of structure and orientation. Therefore, to investigate the scratch behavior of nanoparticle $Al_2O_3$-filled gelatin films produced with different setting times, tests were conducted on films that were aged under ambient conditions (17–21° C., 30–50% humidity) for 30 days.

Example 2

Physical Properties of Composite Films, Scratch Resistance and Optical Clarity

Scratch testing was done at room temperature on a balance-beam scrape, adhesion, and mar tester (model SG-8101, BYK Gardener, Columbia, Md.) using a stainless steel needle stylus (SG 8013). The tip of the stylus has a cone shape with a radius of curvature of about 15 $\mu$m and an angle of 27°. The angle between the sample surface and stylus was set to 45°. A minimum scratch length of 5 mm was generated on the sample surface moving away from the stylus at a speed of 20 mm/second.

An initial load of 20 grams was used for all samples. If a load failed to produce a suitable scratch for atomic force microscopy (AFM) measurement, a higher load was used. All scratch tests were conducted on the sample surfaces in ambient conditions at ca. 17° C. with a relative humidity between 30 and 40%, except for micron-size $Al_2O_3$-filled gelatin films, which were scratched at about 21° C. with a relative humidity between 40% and 50%. The scratched films were stored under ambient conditions and examined by AFM within 48 hours to examine the width, depth, and morphology of the as-produced scratches. The same scratch testing was performed again, 30 days after the initial testing, to evaluate the effect of aging the nano-size $Al_2O_3$ filled gelatin films on their scratch behavior.

A contact mode AFM (AutoProbe CP, Park Scientific Instruments, Sunnyvale, Calif.) was employed to examine the width, depth, and morphology of the as-produced scratches with a maximum lateral resolution of 0.025 nm and maximum vertical resolution of 0.0025 nm. An 80 $\mu$m×80 $\mu$m area was scanned at a rate of 0.5 Hz. The residual scratch morphology is the result of both plastic deformation taking place during the scratch and elastic relaxation (V. Jardret, H. Zahouani, J. L. Loubet, T. G. Mathia, Wear, 218, 8 (1998)) and is composed of the scratch groove itself as well as two pile-ups along the scratch groove caused by plastic deformation. The scratch deformation can be characterized as fully elastic, ironing, ductile ploughing, tearing, edge crack formation, wedge formation, brittle machining, and chip formation, or combinations thereof (B. J. Briscoe, E. Pelillo, and S. K. Sinha, Polymer Engineering and Science, 36, 2996 (1996)). Fully elastic scratches do not cause a permanent scratch indent, and ironing is also primarily elastic. Ductile ploughing, which is relevant to this work, consists of primarily plastic deformation, but without discrete fractures. Tearing, edge crack formation, wedge formation, brittle machining, and chip formation are increasing forms of failure or damage within and around the scratch track. Cracks occur when the tensile stress behind the traveling indenter exceeds the strength of the material, causing tearing of the polymer surface; as the strain rate of testing decreases and the load increases, the degree of damage increases.

Figure 3:
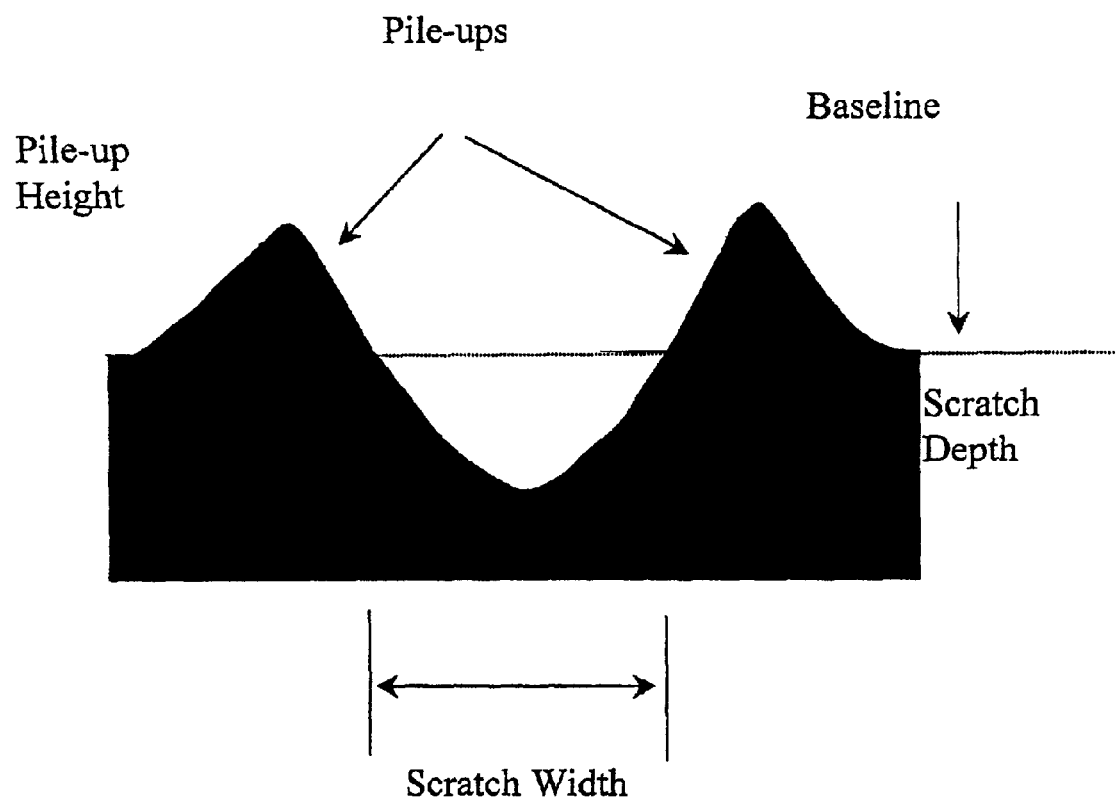
FIG. 3 is a schematic profile of an ideal scratch.
Figure 4A:
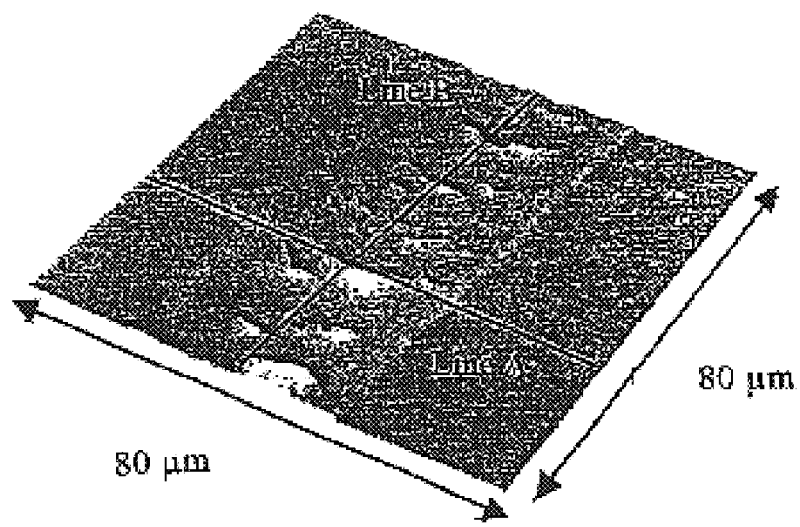
FIGS. 4A–4E are AFM images showing the scratch morphology and scratch profiles of a gelatin film.
Figure 4B:
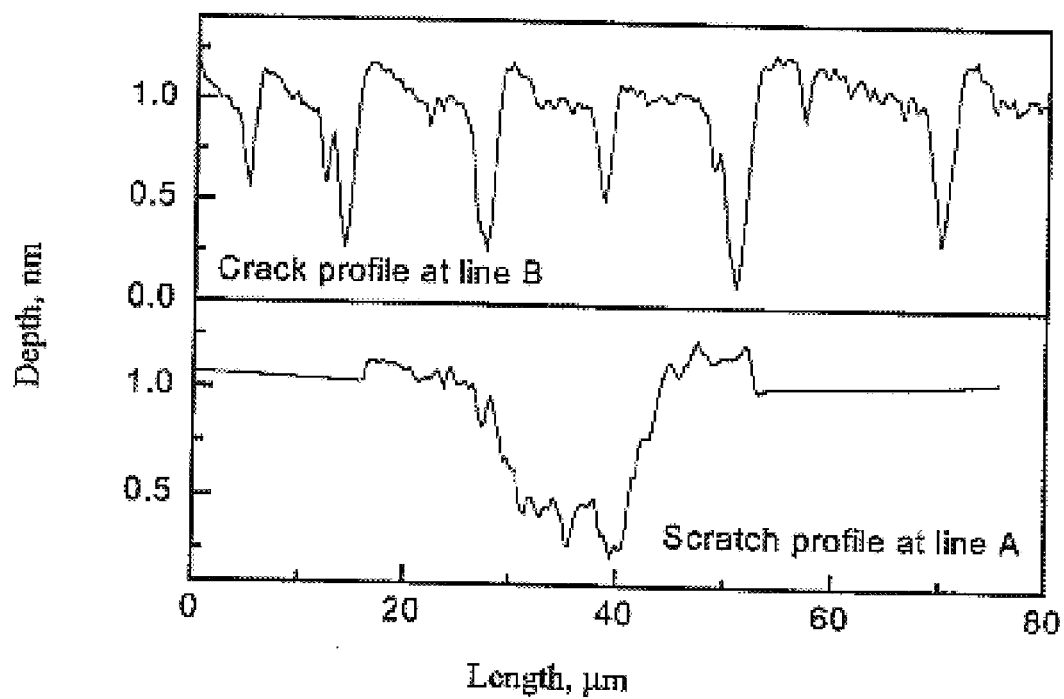
Figure 4C:
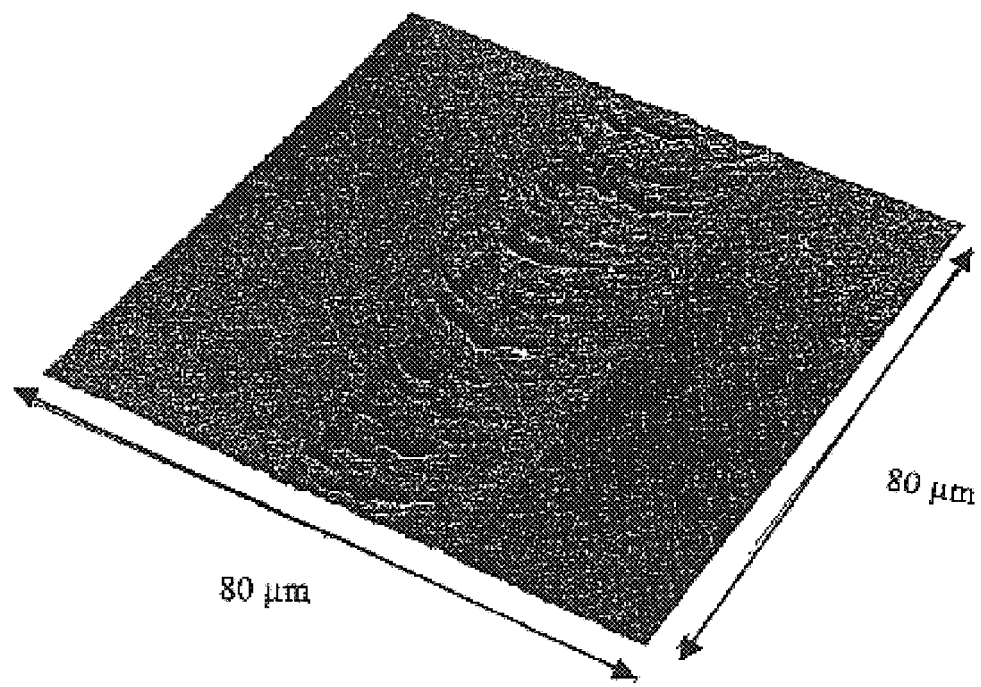
Figure 4D:
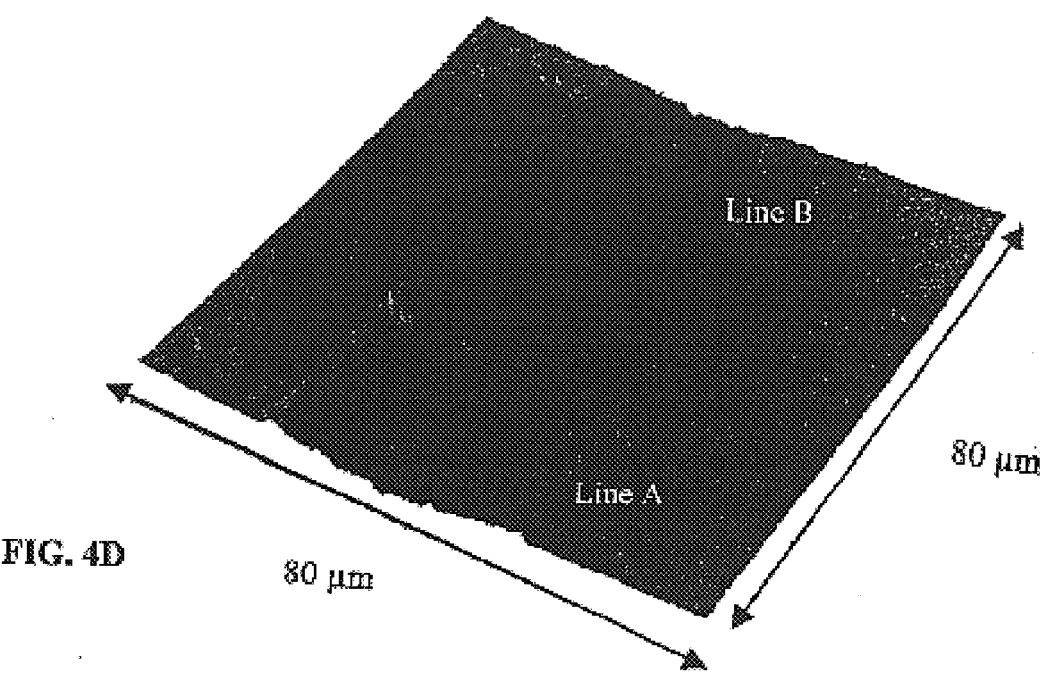
Figure 4E:
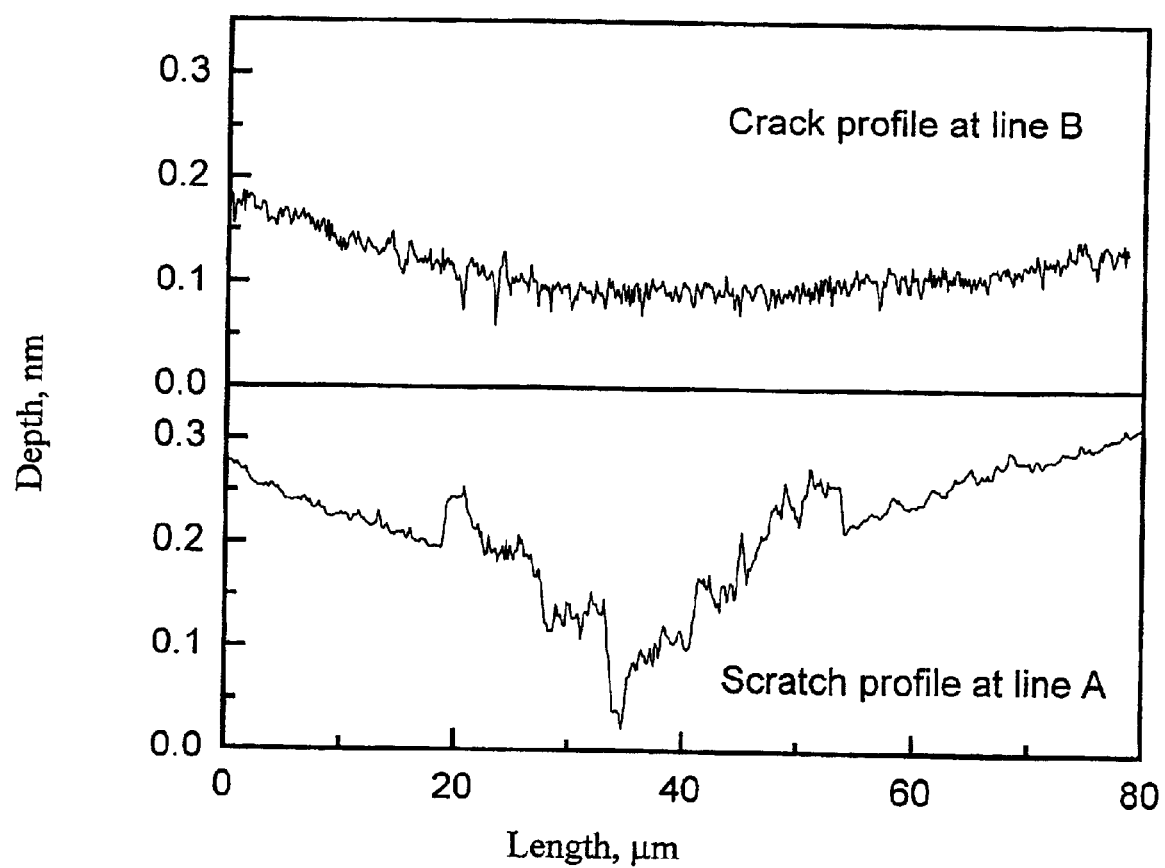

FIG. 3 depicts an ideal scratch profile in which definitions of various parts of a scratch used in the present work are given. However, in this work, the scratch profiles did not always possess this ideal shape. Often a pile-up consisted of more than one peak, and the top of the pile-up was difficult to locate. Consequently, the distance between the tops of two pile-ups could not be measured, and thus the scratch hardness was not calculated. In view of the irregular shape of the observed pile-ups, the scratch width is defined here as the width of the groove at the baseline of the sample surface. In the case of multiple peaks in a pile-up, the average height of these peaks was used as the height for that pile-up. For each scratch, at least five cross-sections perpendicular to the scratch direction were randomly chosen for statistical analysis of scratch profiles. For comparison, the depths of the deepest scratches within the periodic cracks were also measured for samples that exhibited extensive periodic cracking inside scratch tracks.

Example 3

Scratch Testing

Figure 5:
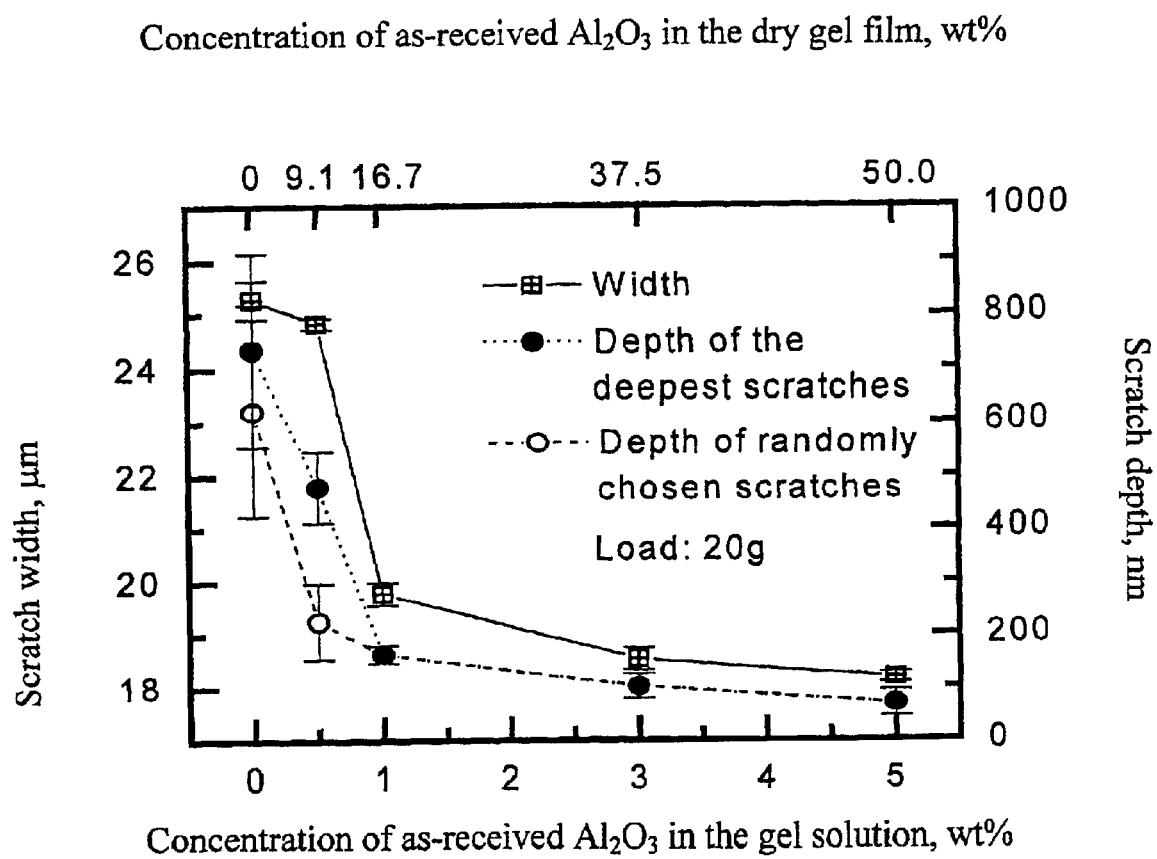
FIG. 5 shows scratch width and depth as a function of as-received $Al_2O_3$ filler concentration.

Scratch tests were conducted on surfaces of unfilled samples and samples filled with as-received nanoparticle $Al_2O_3$ under a load of 20 grams. FIG. 4 shows AFM images and scratch profiles for the unfilled gelatin (a), the 0.5 wt % (9.1 dry wt %) $Al_2O_3$ nanofilled gelatin (AFM image alone) (b), and the 1 wt % (16.7 dry wt %) $Al_2O_3$ nanofilled gelatin (c). The 3 wt % (35.5 dry wt %) and 5 wt % (50 dry wt %) $Al_2O_3$-filled samples exhibited a similar scratch morphology to that of the 1 wt % (16.7 dry wt %) $Al_2O_3$-filled sample. The scratch track of the unfilled gelatin film exhibits extensive periodic cracking and tearing. With the addition of 1 wt % (16.7 dry wt %) as-received nanoparticle $Al_2O_3$ powder to the gelatin, the scratch deformation mode changed to ductile ploughing and there were no cracks inside the scratch track. The scratch profiles shown are perpendicular to the crack and along the bottom of the scratch track as indicated by lines A and B, respectively. In addition to the change in deformation mode, the scratch depth decreased by almost a factor of 10 (FIG. 5), and the scratch width was reduced from more than 25 μm to around 18 μm. Most of this gain in performance was realized with 1 wt % (16.7 dry wt %) filler addition to the gel solution and is primarily due to the lack of tearing within the scratch. FIG. 5 also shows the relationship between the $Al_2O_3$ filler concentration and the depth of deepest cracks that were produced by the tearing inside the scratch track.

Figure 6:
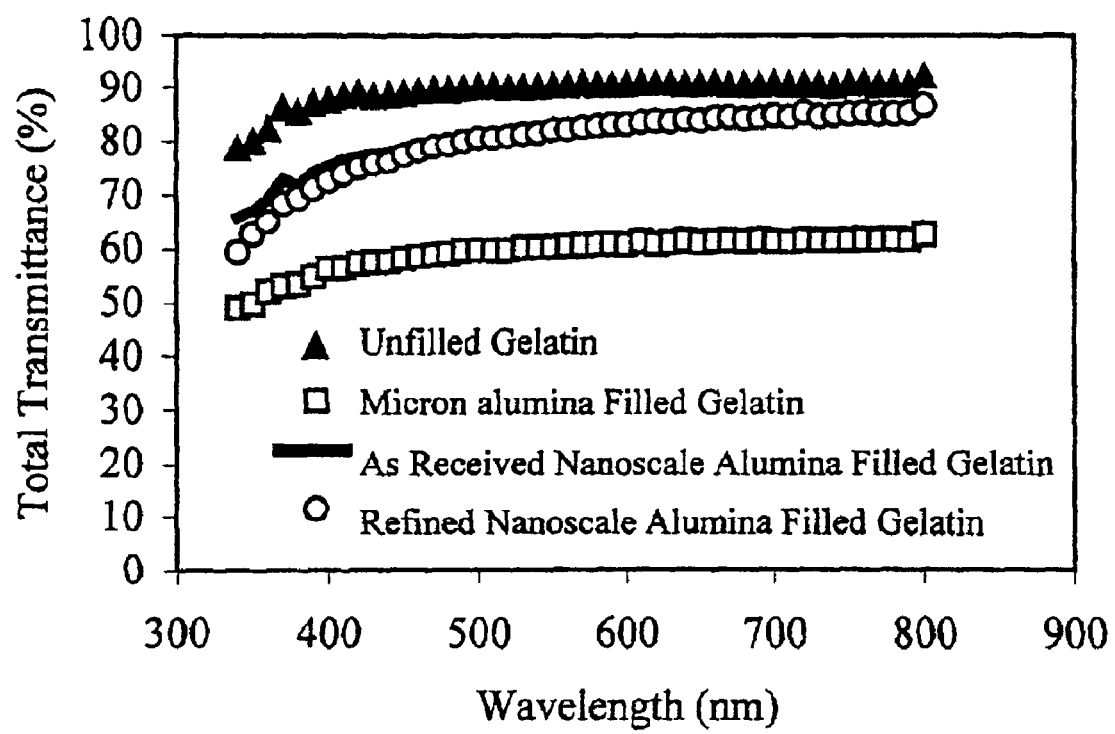
FIG. 6 is a graph showing transparency versus wavelength for unfilled gelatin, 1 wt % (16.7 dry wt %) as-received nanoscale alumina, refined nanoscale alumina, and micron-size alumina/gelatin composites.

One of the advantages of these nanoscale fillers compared to microscale fillers is that the optical clarity of the polymer is maintained while improving the mechanical properties. FIG. 6 shows the optical transmittance as a function of wavelength for several 1 wt % (16.7 dry wt %) $Al_2O_3$/gelatin composites. The transmittance is significantly better than that for micron-scale fillers and at longer wavelengths is almost the same as the unfilled gelatin. When the $Al_2O_3$ content was greater than 3 wt % (35.5 dry wt %), the filled gel films became more opaque. In addition, with increasing amounts of $Al_2O_3$, small pits and bubbles formed on the deionized gel film surface, and the mechanical integrity of the film started to decrease. This cracking was probably exacerbated by the presence of large particles (>100 nm in diameter) in the as-received material that acted as defect nucleation and crack initiation sites. To address these problems, a refined nanoparticle $Al_2O_3$ powder was subsequently used as the filler material.

Figure 7:
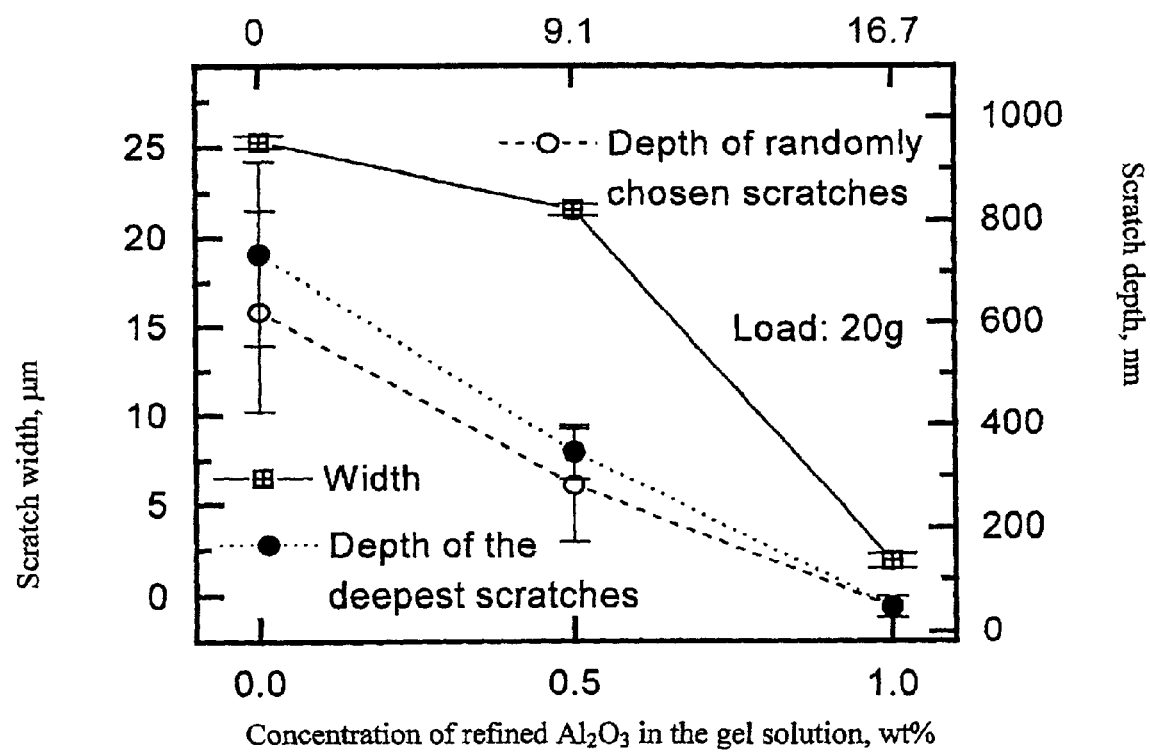
FIG. 7 shows scratch width and depth as a function of refined $Al_2O_3$ filler concentration.

The $Al_2O_3$ powder refined by the centrifuge sedimentation technique had an average particle size of 10 nm and all particles were smaller than 70 nm. Compared with samples containing as-received $Al_2O_3$, surface roughness as determined by visual inspection decreased with the addition of refined nanoparticle $Al_2O_3$. Meanwhile, the mechanical integrity of the samples was maintained and film cracking was observed even for samples with 5 wt % filler. In addition, the optical transmittance improved at low wavelengths (FIG. 6) and even at 5 wt % filler, films were relatively transparent. FIG. 7 shows the results of scratch testing. Further reductions of scratch width and depth beyond those found for the as-received nanopowder fillers were observed.

Figure 8A:
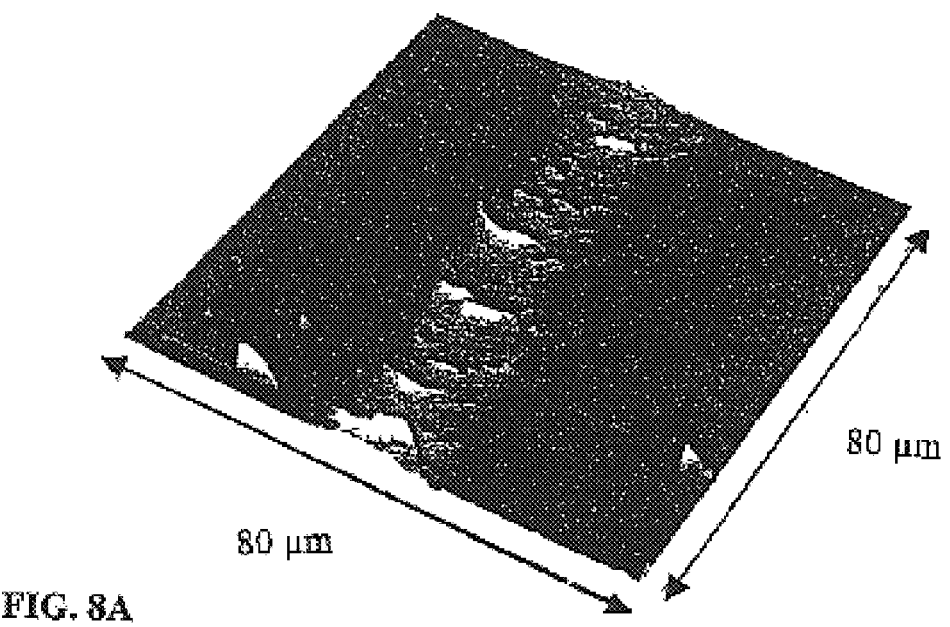
FIGS. 8A and 8B are AFM images showing scratch morphology of 0.5 wt % (9.1 dry wt %) and 1 wt % (16.7 dry wt %) refined $Al_2O_3$-filled gelatin film, respectively.
Figure 8B:
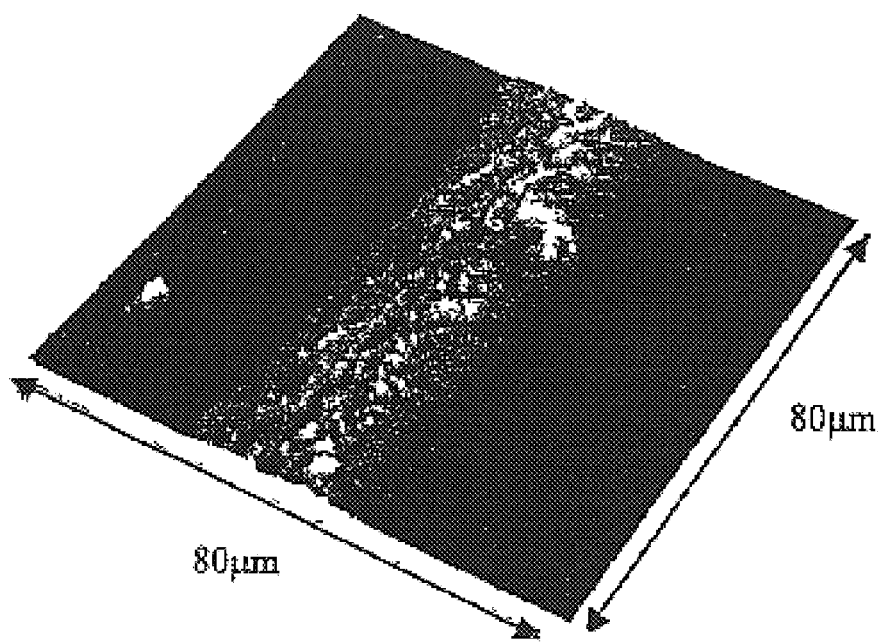

FIGS. 8A and 8B are AFM images showing the scratch morphology of samples filled with 0.5 wt % (9.1 dry wt %) and 1 wt % (16.7 dry wt %) refined $Al_2O_3$, respectively. Although tearing and cracking is present in the 0.5 wt % (9.1 dry wt %) filled sample, it was not visible by AFM in the case of the 1 wt % (16.7 dry wt %) filled sample. Interestingly, the scratch morphology of the 1 wt % (16.7 dry wt %) filled sample is different from other scratches, exhibiting instead a narrow scratch width and wide pile-ups (FIG. 8B). Further work is needed to understand this phenomenon, but for samples with 3 wt % (35.5 dry wt %) and 5 wt % (50 dry wt %) refined nanoparticle fillers, no scratch tracks were observed at a load of 20 g. This indicates clearly that refined nanoparticle $Al_2O_3$-filled samples are more resistant to scratching than those filled with as-received nanoparticle $Al_2O_3$.

Figure 9A:
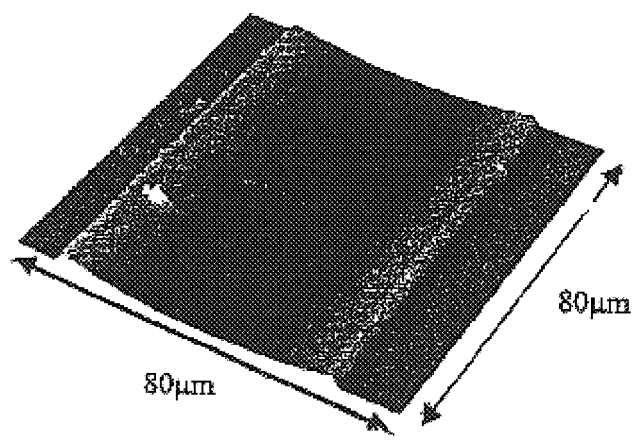
FIGS. 9A–9C show scratch morphology of aged films.
Figure 9B:
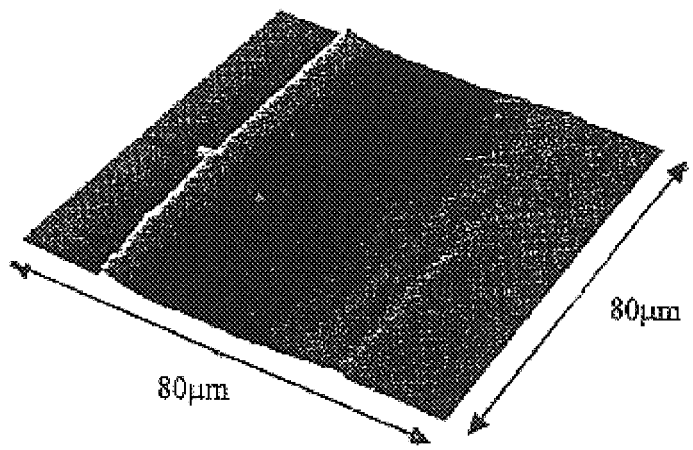
Figure 9C:
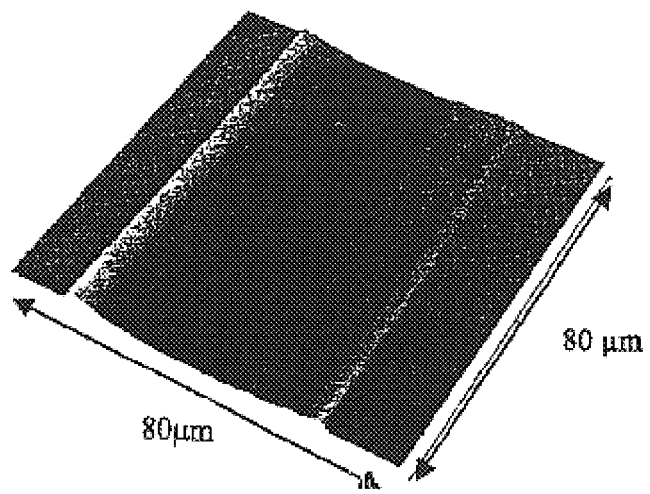
Figure 10:
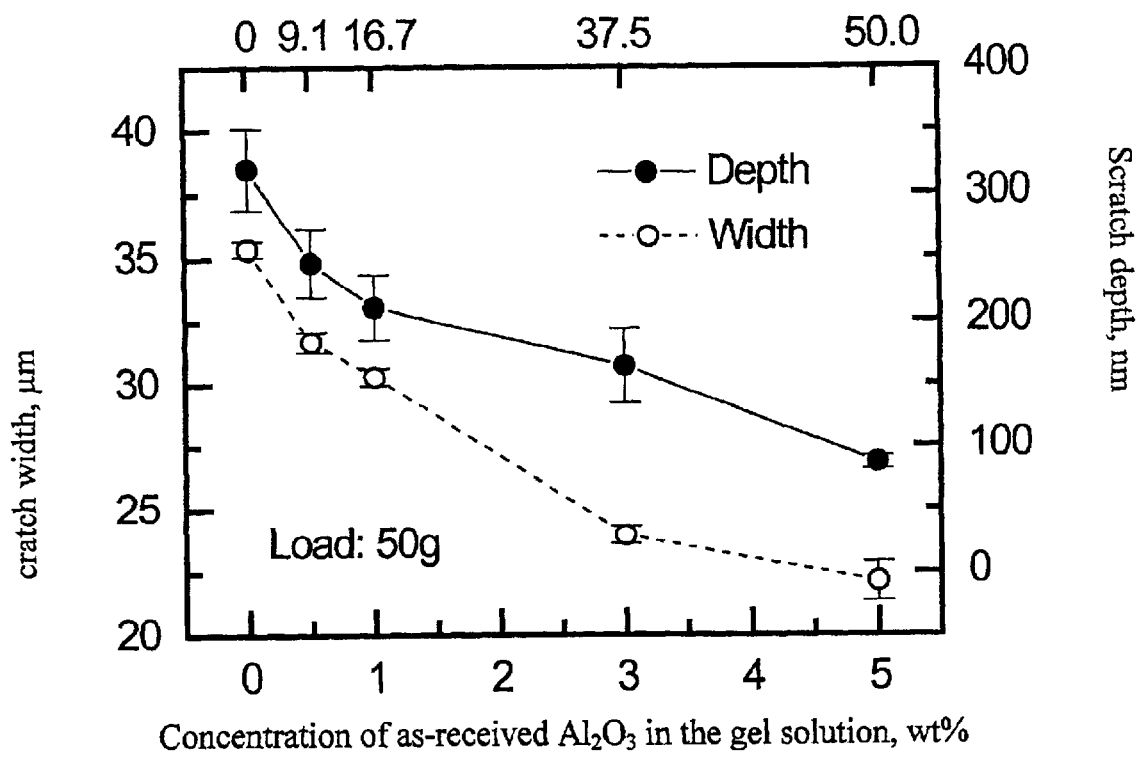
FIG. 10 shows scratch width and depth of aged films as a function of $Al_2O_3$ filler concentration.

For aged films, initially, a load of 20 grams was used but failed to produce a scratch. Therefore, a load of 50 grams was subsequently used. Scratch morphologies of aged films containing 0 wt %, 0.5 wt %, and 1 wt % $Al_2O_3$ nanoparticles (as received) are displayed in FIGS. 9A, 9B, and 9C, respectively. Compared with pure gelatin films tested after oven drying (FIG. 4A), the scratch deformation mode in the aged gelatin film is ductile ploughing and not tearing, even under a higher scratch load, indicating improved intrinsic resistance to scratching under the current aging conditions (FIG. 10). In addition, the 0.5 wt % (9.1 dry wt %) and 1 wt % (16.7 dry wt %) samples also failed by ductile ploughing. The 3 wt % (35.5 dry wt %) and 5 wt % (50 dry wt %) $Al_2O_3$-filled samples exhibited a similar scratch morphology with even smaller width and depth values than observed on unaged samples.

When samples were filled with up to 5 wt % (50 dry wt %) $Al_2O_3$ and aged, the scratch depth decreased by almost a factor of 4 and the scratch width was reduced from more than 35 μm to less than 23 μm. This emphasizes the beneficial effect of nanoparticle versus micron-size $Al_2O_3$ filler. There was no obvious degradation in the optical clarity of these samples.

Figure 11:
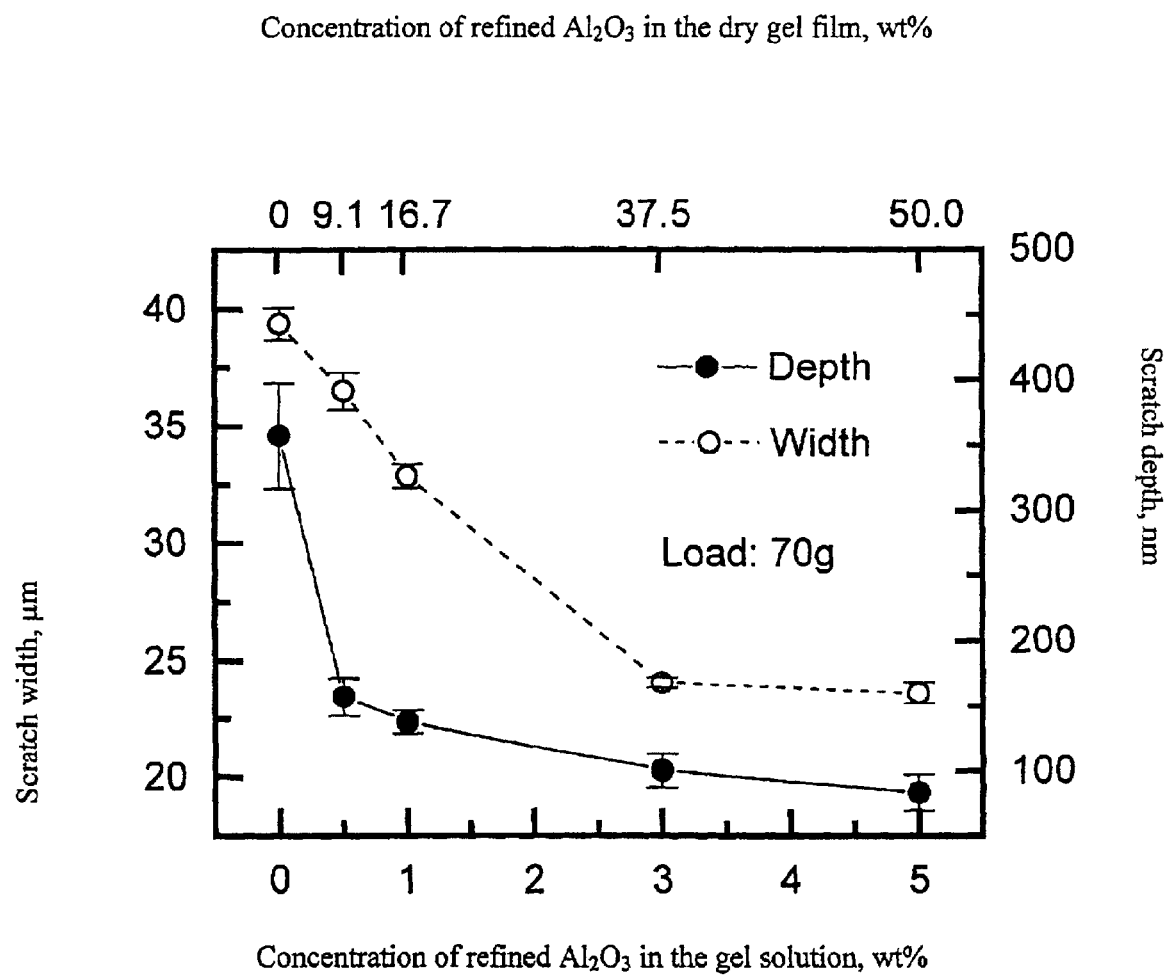
FIG. 11 shows scratch width and depth as a function of refined $Al_2O_3$ filler concentration.

Scratch testing was also conducted on refined $Al_2O_3$-filled deionized gelatin films aged for 30 days. An initial load of 50 grams was not enough to produce a scratch in the unfilled film, so a 70 g load was used. The higher load required to obtain a scratch in these aged samples shows the sensitivity these samples have to the environmental conditions. The reductions of scratch width and depth observed for samples aged for 30 days are shown in FIG. 11. Once again, there was a large decrease in the scratch depth and width as a function of nanofiller concentration. Tearing was observed in the scratches of aged and unfilled deionized gel film at this higher load. However, the presence of 0.5 wt % refined nanoparticle $Al_2O_3$ greatly suppressed tearing in the aged sample. The 1 wt % (16.7 dry wt %), 3 wt % (35.5 dry wt %) and 5 wt % (50 dry wt %) $Al_2O_3$-filled samples also exhibited ductile ploughing. Again, no visible degradation in optical clarity was observed in any of the composite samples due to aging.

The micron-size $Al_2O_3$ powder used contained faceted plate-like particles up to 10 μm in size. When the micron-size $Al_2O_3$/water suspension was ultrasonically mixed with the 5 wt % gelatin/water solution, larger particles started to sink to the bottom of the containing vessel. Sonicating the solution did not keep the micron-size $Al_2O_3$ particles in suspension. Upon pouring the mixture into a petri dish, the larger particles began to sink. Consequently, a limited amount of micron-size $Al_2O_3$ particles was left near the sample surface on which scratch testing was conducted. Thus, one obvious improvement for nanoscale materials is the ease of processing, i.e., they remain in suspension and result in excellent, homogeneous dispersions. After drying, the transparency of the micron-filled gelatin films changed from translucent to nearly opaque, depending on the filler concentrations, and the micron-size filler particles were poorly distributed. It is also apparent from FIG. 6 that the transparency of the micron-scale alumina/gelatin composites is significantly lower than that of the nanoscale alumina/gelatin composites. Reflective spots were observed under optical microscopy in samples filled with 1 wt % (16.7 dry wt %) micron-size $Al_2O_3$, indicating the presence of very coarse particles or agglomerates. Generally, dimensional integrity was maintained for all samples filled with micron-size $Al_2O_3$.

Figure 12:
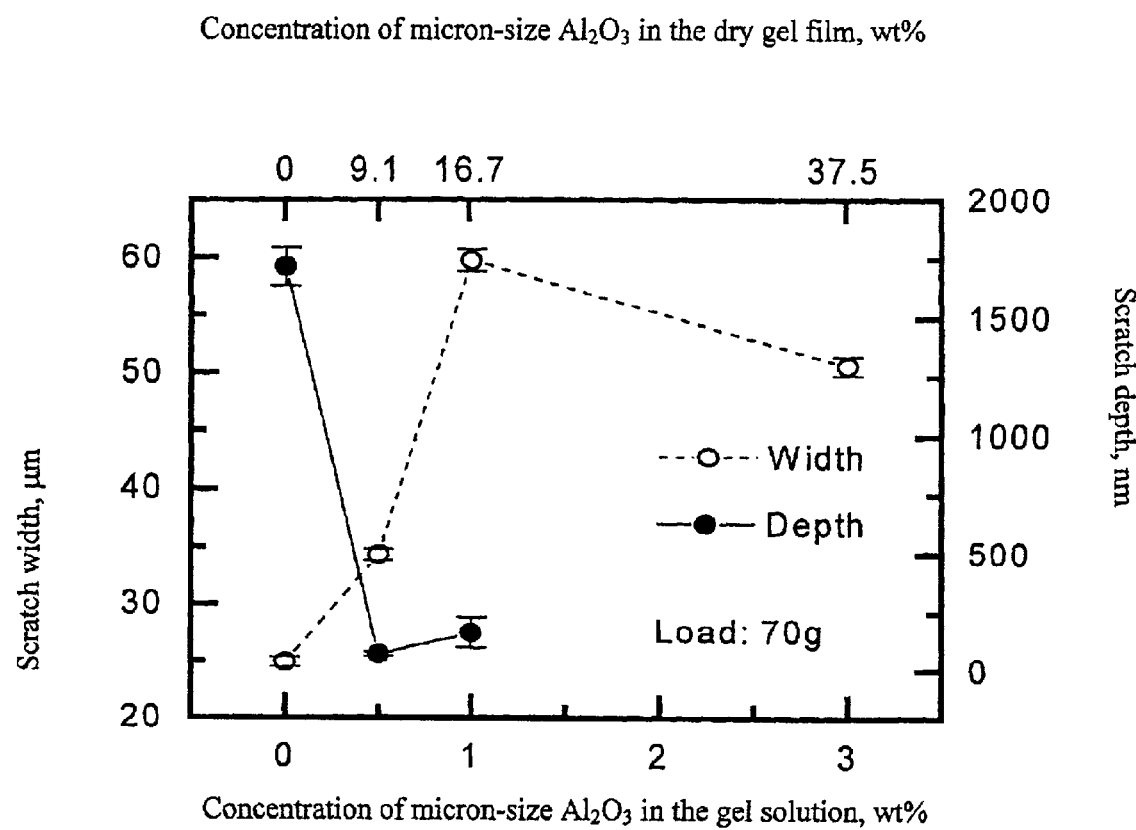
FIG. 12 shows scratch width and depth of micron-size filled gelatin films as a function of $Al_2O_3$ filler concentration.
Figure 13A:
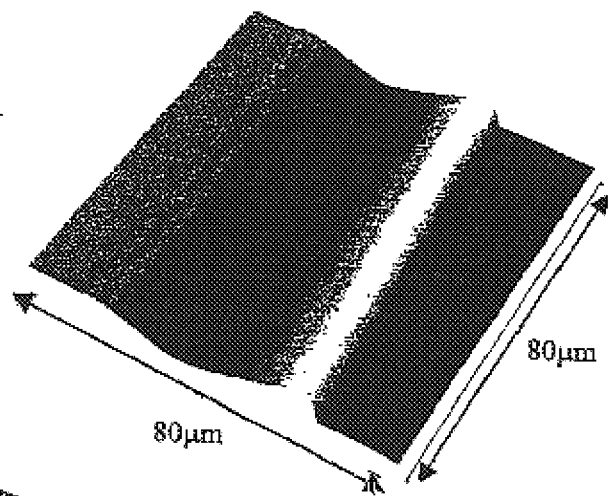
FIGS. 13A–13C are AFM images showing the effect of micron-size filler on scratch morphology.
Figure 13B:
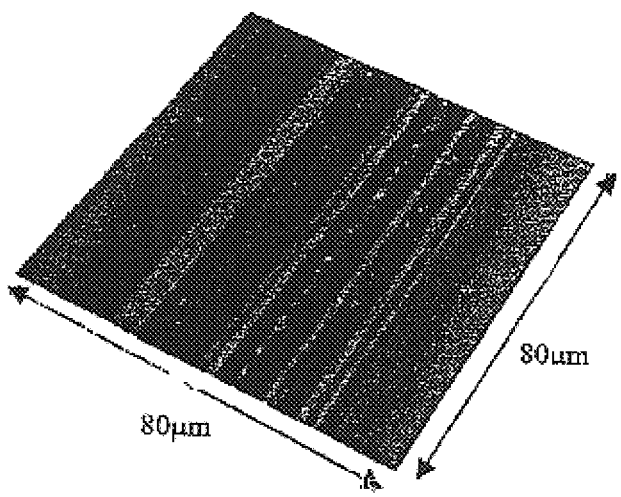
Figure 13C:
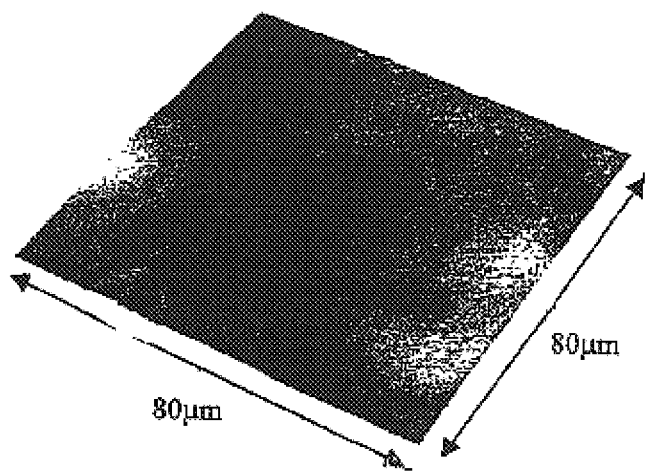

With the addition of micron-size $Al_2O_3$ particles, the scratch width increased from about 24 μm to about 60 μm for 1 wt % addition, as shown in FIG. 12. (It should be noted that the scratch results for nano- and micron-size $Al_2O_3$-filled samples are not directly comparable because of the different conditions under which the samples were tested). Although the scratch width decreased somewhat at 3 wt % (35.5 dry wt %) addition, the general trend of increased scratch width with higher filler concentrations still holds. In spite of a decrease in scratch depth, the overall deterioration in scratch behavior and film transparency is evident with the addition of micron-size $Al_2O_3$ particles. FIG. 13A is an AFM image of a scratch on a unfilled deionized gelatin film. Micron-size $Al_2O_3$ particles were left on the scratch track of 0.5 wt % micro-size $Al_2O_3$-filled deionized gelatin films as evidenced by the white spots in FIG. 13B. With an increase in filler concentration, particle agglomeration occurred under the surface, resulting in contours of agglomerates as shown in FIG. 13C, where the scratch morphology of a 3 wt % (35.5 dry wt %) micron-size $Al_2O_3$-filled deionized gelatin film is displayed. The difference in brightness represents different elevations (brighter indicates higher). As a consequence, the scratch depth could not be determined for this composition. The scratch track on the 5 wt % (50 dry wt %) micron-size $Al_2O_3$-filled gelatin film was not observed.

The scratch deformation mode changed from one in which the fracture strength was exceeded, and both tearing and ductile ploughing were observed (in unfilled gelatin films), to a deformation mode that was only ductile ploughing (in filled gelatin films). In addition, aging the gelatin films changed the scratch deformation mode from tearing to ductile ploughing. Tearing occurs when the stress due to the indenter exceeds the strength of the material. Hence, by changing the fracture strength the scratch deformation mode can be altered. Therefore, the change in deformation mode from tearing and ductile ploughing to just ductile ploughing implies that the strength of the material increased with the addition of filler into the gelatin and with aging of the gelatin films. It was this change in deformation mode from tearing to ductile ploughing that contributed significantly to the decrease in scratch depth.

There were, however, large decreases in scratch depth due to the addition of filler (both nanofiller and micron-size filler), even in the aged samples, which all had the same mode of deformation (ductile ploughing). This reduction in ductile ploughing that resulted in a decrease in the scratch depth was probably the result of an increase in yield stress and modulus due to the addition of filler.

In the present work, some significant effects of filler particle size on the processing and properties of the gelatin films have been demonstrated. The most notable effect as the particle size changes from micron size to nanoscale is optical clarity. A comparison of 1 wt % alumina/gelatin composites (FIG. 6) emphasizes the improved transmittance for the nanoscale alumina samples. Furthermore, 5 wt % nanoparticle $Al_2O_3$/gelatin composites (50 dry wt %) were still reasonably transparent, but 5 wt % (50 dry wt %) micron-scale $Al_2O_3$/gelatin composites were opaque. This can be attributed to significantly less scattering of visible light from the nanoscale particles compared to that from micron-size particles. In addition, the nanoparticle fillers result in stable suspensions and the micron-scale fillers settle out during processing. At the nanoscale, smaller and more monodisperse powders also result in better scratch resistance. The addition of refined nanoparticle $Al_2O_3$ compared to as-received nanoparticle $Al_2O_3$ leads to both smaller scratch depth and width. In addition, a higher load was required (70 g vs 50 g) to even cause a scratch in the refined nanoparticle $Al_2O_3$/gelatin samples compared to the as-received nanoparticle $Al_2O_3$/gelatin samples after both were aged. Finally, the refined nano-size $Al_2O_3$ provided better resistance to cracking during processing. This is probably because the refined nanoparticles, which were all less than 50 nm, were too small to initiate failure. On the other hand, the micron-size fillers lead to a scratch depth that was similar to that for the refined nano-size alumina, but the scratch width increased with filler content. This may have been due to damage that occurs as the larger particles are dragged along the scratch by the stylus.

The effect of aging on properties is due to changes in the gelatin morphology. As the gelatin films age, the microstructure becomes more ordered and there is an increase in modulus and yield strength.

What is claimed is:
1. A method for fabricating a scratch-resistant imaging element having optical clarity, the method comprising
   a. dispersing a ceramic nanoparticle material in an aqueous solution of a film-forming hydrophilic colloid comprising gelatin, dextran, gum arabic, zein, casein, pectin, collagen derivatives, collodion, agar—agar, arrowroot, albumin, polyvinyl alcohol, polyacrylamide, poly(vinylpyrrolidone) or a mixture thereof to form a coating composition;
   b. applying the coating composition to a surface of an imaging layer;

c. drying the coated surface; and, optionally, d. aging the dried coated surface, whereby an element protective layer having both optical clarity and resistance to scratching formed over the imaging layer.

2. A method according to claim 1, wherein the coating composition composes

25–99.9 parts by weight film-forming hydrophilic colloid; and 0.1–75 parts by weight ceramic nanoparticle material.

3. A method according to claim 1, wherein the coating composition composes

50–95 parts by weight film-forming hydrophilic colloid; and

5–50 parts by weight ceramic nanoparticle material.

4. A method according to claim 1, wherein the coating composition comprises

70–90 parts by weight him-brining hydrophilic colloid; and

10–30 parts by weight ceramic nanoparticle material.

5. A method according to claim 1, wherein the film-forming hydrophilic colloid comprises a gelatin.

6. A method according to claim 1, wherein the ceramic nanoparticle material comprises one or more metal oxides.

7. A method according to claim 6, wherein said one or mare metal oxides are selected from the consisting and alumina.

8. A method according to claim 6, said one or more metal oxides are alumina.

9. A method according to claim 1, wherein average particle size of the ceramic nanoparticle material ranges from 3 nm to 100 nm.

10. A method according to claim 1, wherein average particle size of the ceramic nanoparticle material ranges from 5 nm to 50 nm.

11. A method according to claim 1, wherein average particle size of the ceramic nanoparticle material ranges from 10 nm to 30 nm.

12. A method according to claim 1, wherein maximum particle size of the ceramic nanoparticle material is 100 nm.

* * * * *

UNITED STATES PATENT AND TRADEMARK OFFICE
CERTIFICATE OF CORRECTION

PATENT NO. : 6,783,805 B2
DATED : August 31, 2004
INVENTOR(S) : Siegel et al.

It is certified that error appears in the above-identified patent and that said Letters Patent is hereby corrected as shown below:

Column 12,
Line 6, insert the word -- group -- after the word "the" and insert -- of titania -- after the word "consisting"
Line 8, insert the word -- wherein -- after the ","

Signed and Sealed this

First Day of February, 2005

JON W. DUDAS
*Director of the United States Patent and Trademark Office*

UNITED STATES PATENT AND TRADEMARK OFFICE
CERTIFICATE OF CORRECTION

PATENT NO. : 6,783,805 B2
DATED : August 31, 2004
INVENTOR(S) : Siegel et al.

It is certified that error appears in the above-identified patent and that said Letters Patent is hereby corrected as shown below:

Column 11,
Line 3, delete the words "an element" and insert -- a --

Signed and Sealed this

Third Day of May, 2005

JON W. DUDAS
*Director of the United States Patent and Trademark Office*